Jan. 21, 1969   E. L. FORTIER   3,423,023
IRRIGATION SYSTEM
Filed March 30, 1966
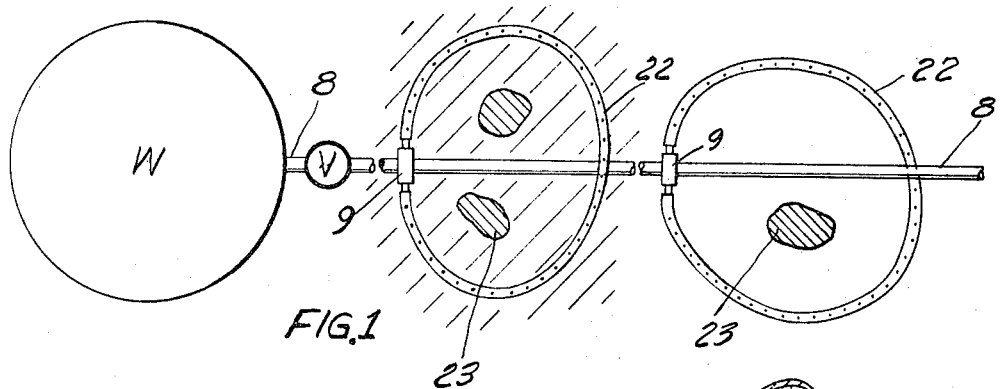
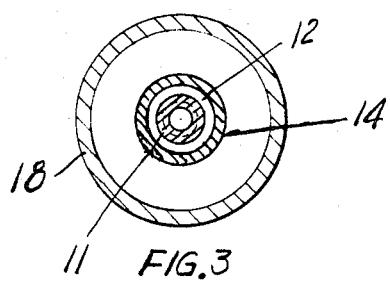
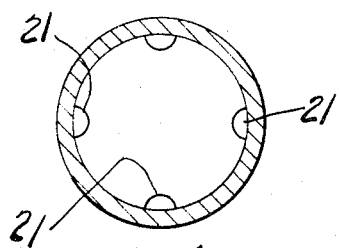
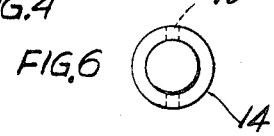
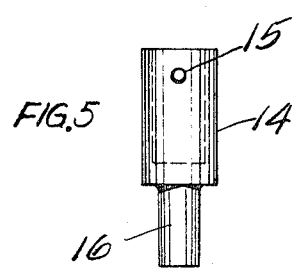
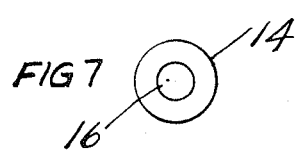
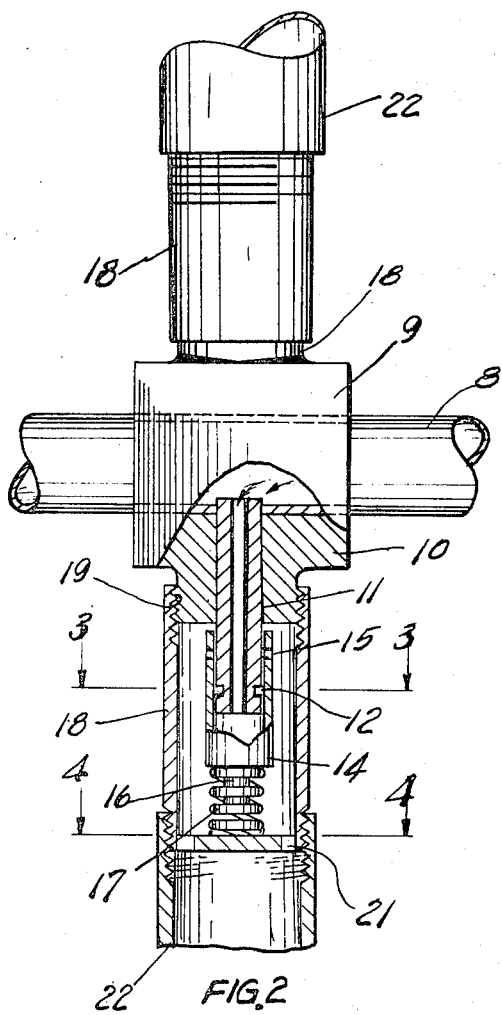
INVENTOR.
Ernest L. Fortier
BY
Pearman Pearman &
McCulloch
Attorneys

United States Patent Office 3,423,023
Patented Jan. 21, 1969

3,423,023
IRRIGATION SYSTEM
Ernest L. Fortier, Rte. 2, Alpena, Mich. 49707
Filed Mar. 30, 1966, Ser. No. 538,747
U.S. Cl. 239—207                                    5 Claims
Int. Cl. B05b 3/00; A62c 37/00; B67d 5/54

ABSTRACT OF THE DISCLOSURE

The present invention relates to an irrigation system having a plurality of water disseminating members arranged in spaced apart relation with a supply line connected to a source of water to provide a continuous seepage of water above or beneath the surface of the ground, and means regulated by the pressure in the line for opening or closing the control disseminating members.

---

This invention relates to irrigating systems and particularly to an irrigating system adapted to provide water for the health and growth of trees, shrubs, flowers and plant life in general.

The prime object of the invention is the provision of an irrigating system wherein water is released, either on or below the surface of the ground, which can be used on hillsides or level land, which is automatic in operation, easy to install, and which is extremely economical to manufacture and use.

Another object of the invention is to provide an irrigation system whereby the supply and distribution of water, chemicals, air or gas can be accomplished with complete and intentional control over such results as volume and time and space, said control being exercised in accordance with the existing conditions so as to obtain over all optimum results.

Another object of the invention is to provide a number of connected water disseminating members arranged in spaced apart relation to suit the area to be irrigated, and provide a supply line connected to a suitable source of supply with means connected to the supply line and regulated by the pressure in the line for opening and/or closing the control valves.

Still a further object is to provide means controlled by the pressure in the supply line for opening and/or closing the control valve.

A further object of the invention is to provide a simple, practical, and relatively inexpensive adjustable means actuated by the pressure in the supply line for controlling the discharge of water from the connected disseminating members when the system is in operation.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

FIGURE 1 is a diagrammatic view showing an area equipped with my irrigating system, one being installed on the surface of the ground, and one below the surface of the ground, as indicated by the cross hatching.

FIGURE 2 is an enlarged elevational view of one of the control valves, parts being broken away to more clearly show the construction.

FIGURE 3 is a transverse sectional view taken on the line 3—3 of FIGURE 2.

FIGURE 4 is also a transverse sectional view taken on the line 4—4 of FIGURE 2.

FIGURE 5 is a side elevational view of the valve cap.

FIGURE 6 is an end elevational view of the valve cap, and

FIGURE 7 is an opposite end elevational view thereof.

The irrigation system shown herein is connected to a source of pressurized water supply and arranged around one or a plurality of trees, shrubs, flower beds or other plant life to provide water for the healthful growth thereof, and it will be obvious that the system can be installed either under ground or on the surface of the ground, and arranged in any desired pattern to irrigate plant life in general.

A preferably plastic supply pipe 8 is connected to a source of water supply W under pressure, usually furnished by a city water plant, reservoir, or other source (not shown), and a plurality of head fittings 9 are mounted in the line 8 in selected spacing and each head fitting is preferably formed of plastic, having laterally projecting hubs 10, externally threaded, as shown, and a hollow valve stem 11 is mounted in said head fitting, one end extending into said hub and communicating with the supply pipe 8, as shown.

A circular groove 12 is provided in the wall of the stem 11 at a point intermediate its length, and a hollow cap member 14 is slidably mounted on the outer end of said stem and is formed with equidistant ports 15 therein, the upper end of the cap being solid and of reduced diameter to form a hub 16 on which one end of a coil spring 17 is mounted. A pipe extension 18 forms an enclosure for the pressure responsive control valve assembly, the inner end threadably engaging the threaded section 19 of the hub 10, and the outer end 20 of said extension having a plurality of openings 21 therein to permit escape of the liquid released by operation of the valve assembly.

In operation, pressure in the supply line 8 forces liquid outwardly through the valve stem 11, into cap 14, to bring the ports 15 into alignment with the groove 12 to release a limited water supply through the ports 15 and into pipe 18, thence through openings 21 to the perforated soak pipe 22 to ground. When pressure in the supply line is reduced, the cap 14 is forced inwardly by pressure of spring 17 closing the valve stem groove 12 and forcing the ports 15 out of communication therewith, and the valve so remains until pressure in the supply line is sufficient to again force the cap outwardly compressing spring 17 and bringing the ports 15 into register with the groove 12. Pressure in the supply line is substantially the same in all heads. Consequently, the valves insure approximately the same volume of water in each head.

This system can be made up in any desired pattern or configuration, and in FIGURE 1 of the drawing I have shown the ends of a pair of head fittings 18 connected by means of a perforated hose 22 so that the metered water flow has a large number of discharge outlets, and the moisture is more evenly distributed over the area being irrigated.

The underground installation is shown sectioned on FIGURE 1 of the drawing, and here again a perforated hose 22 is shown connected to a couple of head fittings 9, and shrub trunks are indicated at 23, but it will be understood that these can be flowers or any other plant life requiring water for healthful growth.

From the foregoing description it will be obvious that I have perfected a very simple, practical and economical valve arrangement for irrigation systems, which can be readily manufactured and assembled, and which can be easily installed in an orchard, under shrubbery or plants, or in fact any place where it is desired to provide moisture to promote the growth of plant life in general.

What I claim is:

1. A land irrigating system for supplying liquid solutions to trees, shrubs and plant life comprising: a supply pipe connected to a source of liquid supply; a plurality of head fittings connected to said supply line in linear spaced apart relation; a hollow valve stem in each head and open to said supply line; a hollow cap member slidably mounted on the outer end of said valve steam and controlling the liquid discharge therefrom; a circular groove in the outer wall of said valve stem at a point intermediate its length, a pipe extension connected to said head fitting and forming an enclosure for said stem; resilient means interposed between said cap and the pipe extension; and openings in said pipe extension to permit the escape of liquid therefrom.

2. The combination defined in claim 1 in which a perforated pipe line connects the ends of a plurality of control valves; a circular groove provided on the outer wall of the valve stem; and ports in the cap member movable into and out of register with the circular groove when pressure in the supply line is sufficient to actuate the cap.

3. A land irrigating system for supplying liquid solutions to trees and plant life comprising: a supply pipe connected to a source of liquid supply; a plurality of head fittings connected to said supply line in linear, spaced apart relation; a hollow valve stem in each head and open to said supply line; a hollow cap member slidably mounted on the outer end of the valve stem and controlling the liquid discharge therefrom; a pipe extension connected to said head fitting and forming an enclosure for said stem; and resilient means interposed between said cap and the pipe extension; openings in said pipe extension to permit the escape of liquid therefrom; a circular groove provided in the outer wall of the valve stem; and ports in the cap member which are movable into and out of register with the circular groove when pressure in the supply line is sufficient to move said cap.

4. An irrigation system for supplying water and aqueous solutions to shrubs and plant life comprising: a supply pipe connected to a source of pressurized liquid supply; a plurality of spaced apart head fittings mounted on and communicating with said supply line; a hollow valve stem in each head and a circular groove in the outer wall of said valve stem; a cap mounted on the outer end of the valve stem; circumferentially spaced ports in said cap in spaced apart relation with said circular groove; and resilient means exerting inward pressure on said cap to move the ports out of register with said circular groove.

5. The combination set forth in claim 4 in which the upper end of the cap is formed with an elongated shouldered extension, and a spring mounted on said shoulder and interposed between said cap and the outer end of said head fitting.

References Cited

UNITED STATES PATENTS

| 986,003 | 3/1911 | Von Hohenstein | 239—207 |
| 2,372,324 | 3/1945 | Hauser | 239—66 X |
| 2,804,881 | 9/1957 | Seid et al. | 137—508 X |

M. HENSON WOOD, JR., *Primary Examiner.*

MICHAEL Y. MAR, *Assistant Examiner.*

U.S. Cl. X.R.

103—50; 137—508; 222—194; 239—562